(12) United States Patent
Figlin et al.

(10) Patent No.: US 8,719,942 B2
(45) Date of Patent: May 6, 2014

(54) SYSTEM AND METHOD FOR PRIORITIZING COMPUTERS BASED ON ANTI-MALWARE EVENTS

(75) Inventors: Igal Figlin, Zikhron Yakov (IL); Lior Arzi, Atlit (IL); Sterling Reasor, Bellevue, WA (US); Eyal Zangi, Yaacov (IL); Ahmad S. Hussain, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 517 days.

(21) Appl. No.: 12/704,391

(22) Filed: Feb. 11, 2010

(65) Prior Publication Data

US 2011/0197277 A1      Aug. 11, 2011

(51) Int. Cl.
*H04L 29/06* (2006.01)

(52) U.S. Cl.
USPC .............................................. 726/25; 726/23

(58) Field of Classification Search
USPC ..................................................... 726/23, 25
See application file for complete search history.

(56) References Cited

U.S. PATENT DOCUMENTS

| | | | |
|---|---|---|---|
| 7,392,544 B1 | 6/2008 | Pavlyushchik | |
| 7,530,106 B1 | 5/2009 | Zaitsev | |
| 7,698,275 B2* | 4/2010 | O'Brien et al. | 707/999.009 |
| 7,962,960 B2* | 6/2011 | Fudge | 726/25 |
| 8,117,659 B2* | 2/2012 | Hartrell et al. | 726/24 |
| 2003/0093692 A1 | 5/2003 | Porras | |
| 2004/0117658 A1 | 6/2004 | Klaes | |
| 2005/0132230 A1 | 6/2005 | Miclea | |
| 2006/0206940 A1 | 9/2006 | Strauss | |
| 2006/0282895 A1 | 12/2006 | Rentzis | |
| 2007/0016952 A1 | 1/2007 | Stevens | |
| 2007/0043674 A1* | 2/2007 | DiFalco et al. | 705/51 |
| 2007/0107058 A1 | 5/2007 | Schuba | |
| 2007/0214412 A1* | 9/2007 | Arquie et al. | 715/526 |
| 2007/0220602 A1 | 9/2007 | Ricks | |
| 2008/0209557 A1 | 8/2008 | Herley | |
| 2009/0217381 A1 | 8/2009 | Helman | |

OTHER PUBLICATIONS

Strategies for Managing Malware Risks , Microsoft , Aug. 18, 2006 pp. 4-19.*
Outpost Security Suite Pro Detailed Features—Published Date: 2009 http://www.agnitum.com/products/security-suite/features.php, printed Jan. 11, 2010.

(Continued)

*Primary Examiner* — Kambiz Zand
*Assistant Examiner* — Ghodrat Jamshidi
(74) *Attorney, Agent, or Firm* — Henry Gabryjelski; Kate Drakos; Micky Minhas (57) ABSTRACT

Tracking malware state information assigned to computers in an enterprise network is described. A computer may transition from a current malware state to a new malware state in accordance with a plurality of stored rules and detection of an anti-malware event on the computer. Examples of anti-malware events include, but are not limited to, detection of new malware on the computer or cleaning of the computer. The malware state information for computers on the network may be mapped to a risk level representing an amount of risk that infected computers present to other computers on the network. The results of a risk level assessment for the computers on the network may be output via a user interface to enable an administrator of the network to prioritize servicing of computers with detected malware.

20 Claims, 9 Drawing Sheets

(56) References Cited

OTHER PUBLICATIONS

Active Anti-Malware Protection—Published Date: Jan. 30, 2009 htttps://www.ironkey.com/files/whitepapers/anti-malware-protection.pdf, printed Jan. 11, 2010.

Steve R. Snapp et al., "DIDS (Distributed Intrusion Detection System)—Motivation, Architecture, and an Early Prototype"—Published Date: 1997, http://seclab.cs.ucdavis.edu/papers/DIDS.nesc91.pdf, printed Jan. 11, 2010.

Suresh N. Chari et al. "BlueBoX: A Policy-Driven, Host-Based Intrusion Detection System", Published Date: 2003 http://reference.kfupm.edu.sa/content/b/l/bluebox_a_policy_driven_host_based_int_77729.pdf, printed on Jan. 11, 2010.

Gregory B. White, Cooperating Security Managers: A Peer-Based Intrusion Detection System:, *IEEE Network*, Published Date: Feb. 1996 http://www.comsoc.org/ni/private/1996/jan/pdf/White.pdf, printed on Jan. 11, 2010.

A Virtual Machine Introspection Based Architecture for Intrusion Detection—Published Date: Mar. 26, 2005 http://suif.stanford.edu/papers/vmi-ndss03.pdf, printed on Jan. 11, 2010.

* cited by examiner

| CURRENT STATE | ANTI-MALWARE EVENT | NEW STATE | RISK |
|---|---|---|---|
| All | No new detections OR full scan, no MW detected | S0 | None |
| S0 | Blocked infection from remote source | S0 | None |
| S0 | MW only found in local read-only drives | S5 | Low |
| S0 | Successful (old) MW removal from local disk | S7 | Low |
| S3 | Infection ages | S7 | Low |
| S0, S5, S7 | Detect operational problems | S6 | Medium |
| S0, S5 | Successful (new) MW removal from local disk | S3 | Medium |
| S0 | Failed MW removal from read-only drives | S3 | Medium |
| S0, S3, S5 | Failed MW removal from local disk | S1 | High |
| S0, S5, S6 | Repeated MW detection | S2 | High |
| S3, S7 | Repeated MW detection | S2 | High |
| S2 | Repeated cleaned detections | S1 | High |
| All | Detect active/running MW | S4 | High |
| S7 | Additional MW not cleaned | S1 | High |
| S6 | Any MW detection | S1 | High |

SYSTEM AND METHOD FOR PRIORITIZING COMPUTERS BASED ON ANTI-MALWARE EVENTS

BACKGROUND

The interconnected nature of modern day computer systems which often use insecure means of transferring data across global public networks such as the Internet has provided potential exposure for misuse of computers connected to such public networks through the installation of malicious software (also known as "malware") on computers in the network. In general, malware is intrusive or unwanted software or program code that is installed on a computer without the user of the computer's consent and includes computer viruses, worms, trojan horses, spyware, etc. Installation of malware on a computer may in some instances result in severe performance degradation, infection of critical computer files, digital information theft, or can be used as a portal for committing various other computer crimes by users of remotely connected computers.

Anti-malware programs have been developed to detect and remove malware from computers. These types of anti-malware programs typically scan computer memory to search for suspicious files that may be malware and provide the list of suspicious files to a user or administrator to determine which files to remove. Alternatively, files or program code with known malware signatures may be automatically deleted from a computer system in an attempt to "clean" the system of malware. Other anti-malware programs attempt to block the installation of malware in real-time by, for example, scanning all incoming network data for malware signatures and blocking any suspicious data from being installed.

The problem of malware may be exacerbated if it is installed on computers in an enterprise network which is configured to enable users in an organization to access shared data and computing resources. That is, because users in an enterprise network often freely exchange data and resources between computers in the network, the spread of malware from computer to computer in the network is more likely to occur, resulting in significant time and expense required by information technology personnel to clean the infected computers.

Organizations that use an enterprise network often install anti-malware software on individual client computers in the network to detect malware on the client computers. In some enterprise networks, the results of the malware detection may be transmitted to an administrator of the network to enable the administrator to determine which computers are infected and need servicing. For example, the results may be transmitted to the administrator as one or more detection logs that identify all of the infections in the enterprise network. Often malware reporting not only identifies which computers are infected, but also identifies the severity of the malware that was detected on each of the infected computers. Administrators can then use information in the detection logs, including the severity information, to determine how to service the infected computers in the network.

SUMMARY

The inventors have recognized and appreciated that improved network administration may result from tracking malware-related states of multiple network clients. Servicing to address malware infections can be more appropriately prioritized using state information. The state information may be based, at least in part, on the historical chronology of infection and remediation activities for the individual client computers. States may be associated with risk levels such that the state of each client may be mapped to a risk level for assessment by an administrator.

By tracking the risk associated with each computer, an administrator of the network can more effectively prioritize which computers to service first. The administrator may be able to quickly identify, for example, high-risk computers for which clean operations have repeatedly failed to remove malware. By using this state information, the administrator can focus resources on the computers in the network that have potential for causing the greatest risk to the organization's network.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

As the size of enterprise networks grow, it becomes increasingly more difficult to keep track of malware infections that have infiltrated one or more computers in the network thereby exposing the network to security vulnerabilities. In some enterprise networks, malware is detected by individual computers and the results of the malware detection are transmitted to an administrator of the network as one or more detection logs to enable the administrator to determine which computers have installed malware and need servicing. The information in the detection logs often include both the identity of the infected computers and the severity of malware infections. The severity information in the logs may then be used by the administrator to determine how to clean the infected computers in the network. However, the amount of information in the detection logs may be overwhelming for an administrator to sort through and using severity information as the metric for determining which computers to clean first may not always be the most efficient or effective solution.

Applicants have recognized and appreciated that the process of malware detection and remediation may be improved by tracking malware state information assigned to computers in an enterprise network, wherein a computer may transition to a different malware state in response to an anti-malware event such as detection of new malware on the computer or cleaning of the computer. The malware state information for computers on the network may be mapped to a risk level to enable an administrator of the network to prioritize servicing computers having malware detected thereon.

To this end, some embodiments of the invention provide techniques for assigning a risk level to computers in an enterprise network based on malware state information associated with each of the computers. When an anti-malware event is detected, a first state associated with a particular computer may transition to a second state depending on the content of the detected anti-malware event. A risk assessment for some or all of the computers in the network may be determined by mapping current state information for the computers to a risk level using one or more rules. By prioritizing computers based on risk, an administrator can identify and focus on servicing those computers which present the most risk to the enterprise network.

Figure 1:
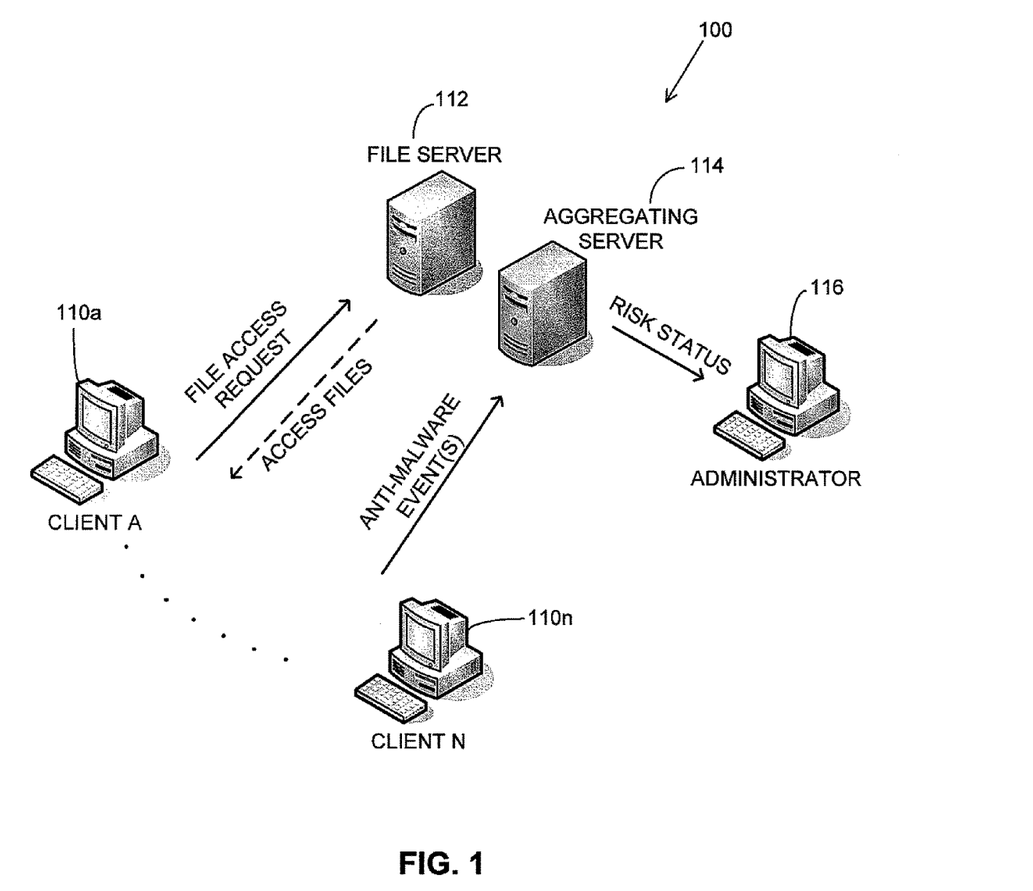
FIG. 1 is a schematic of an exemplary enterprise network environment in accordance with some embodiments of the invention.

FIG. 1 illustrates an exemplary network environment 100 within which some embodiments of the invention may be implemented. A plurality of client computers 110a-110n may be connected to one or more servers via a direct connection or via a private network such as a local area network (LAN) or intranet or a public network such as the Internet. Exemplary servers in network environment 100 include a file server 112 which stores and/or provides access to a plurality of files in response to file access requests from client computers 110a-110n. For example, client computer 110a may be a desktop computer of an employee in a corporation and file server 112 may be an email server that stores email files for the enterprise network associated with the corporation. A user of client computer 110a may send a request to file server 112 to retrieve an email file stored thereon and in response to the request the file server 112 may return the requested email file to the client computer 110a. It should be noted that malware infections on network computers such as file server 112 which may be repeatedly accessed by client computers 110a-110n may provide a significant security vulnerability to the network due to the potential for increased exposure to the malware as a result of the repeated accesses.

At least some of client computers 110a-110n may be configured to detect malware by employing one or more anti-malware agents installed thereon. In some embodiments, detected anti-malware events may be transmitted to aggregating server 114 which receives and stores current state information for each of client computers 110a-110n in network environment 100. Alternatively, state information may be stored locally within client computers 110a-110n and the state information may be periodically provided to aggregating server 114 for risk assessment analysis. It should be appreciated that the state information may be provided at regular intervals to aggregating server 114 or in response to a request from aggregating server 114 to provide the state information.

Aggregating server 114 collects state information from client computers 110a-110n on the network and maps the client states to risk levels based on predefined criteria and/or rules. The process for mapping states to risk levels in accordance with some embodiments will be described in more detail below. Aggregating server 114 may transmit risk level information associated with one or more of client computers 110a-110n to administrator computer 116 to enable an administrator of enterprise network to more efficiently determine which computers to service first.

Figure 2:
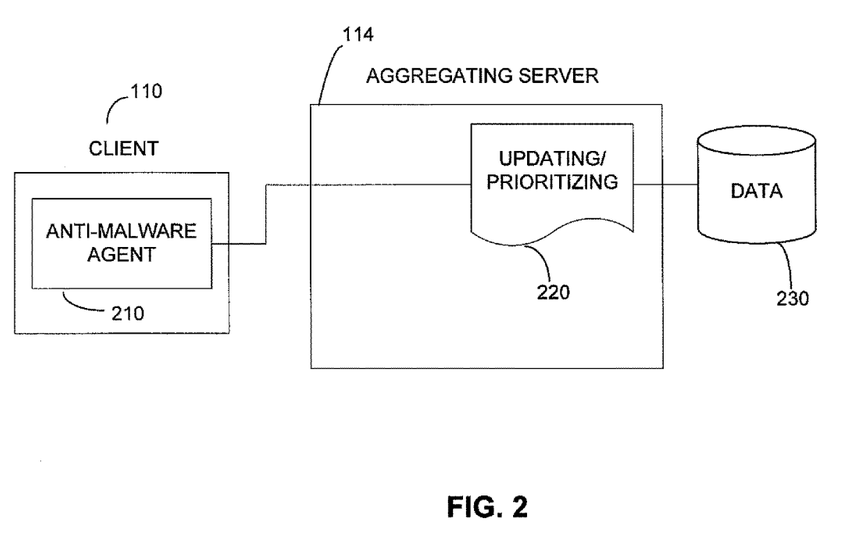
FIG. 2 is a client-server architecture that may be used in accordance with some embodiments of the invention.

FIG. 2 illustrates an exemplary client-server architecture that may be used in accordance with some embodiments of the invention. Client computer 110 includes anti-malware agent 210 executing thereon. Anti-malware agent 210 may include any type of hardware, software, or combination thereof that is configured to scan and/or detect malware installed on client computer 110 and embodiments of the invention are not limited in this respect. Upon detecting an anti-malware event or in response to receiving a request from aggregating server 114, anti-malware agent 210 transmits anti-malware event information to aggregating server 114. Alternatively, client computer 110 may transmit information about its malware state to aggregating server 114 based on risk logic stored within client computer 110. Aggregating server 114 may store the malware state information received from a client computer 110 and the malware state information may periodically be provided to administrator computer 116.

It should be appreciated that anti-malware events include not only the detection of new malware on client computer 110, but also may include events such as a successful cleaning of client computer 110 by anti-malware software, the passage of time since the last infection, the location or path of the detected malware (e.g., network vs. local), or any other type of event related to the malware status of client computer 110.

Aggregating server 114 may employ an updating routine 220 to determine if the state of client computer 110 has changed based on the anti-malware event information received from client computer 110. Current state information for the plurality of computers in an enterprise network may be stored in datastore 230 which is accessible by aggregating server 114. Alternatively, as described above, current state information for client computer 110 may be locally stored and the current state information may be provided to aggregating server 114 periodically or in response to a request from aggregating server 114. To determine if the state of client computer has changed based on the received anti-malware event information, updating routine 220 in aggregating server 114 may request the current state information for client computer 110 from datastore 230 and updating routine 220 may determine if the anti-malware event information received from client computer 110 results in a change in the state assigned to client computer 110. A further description of states and state transitions in response to detected anti-malware events is provided in more detail below.

Figure 3:
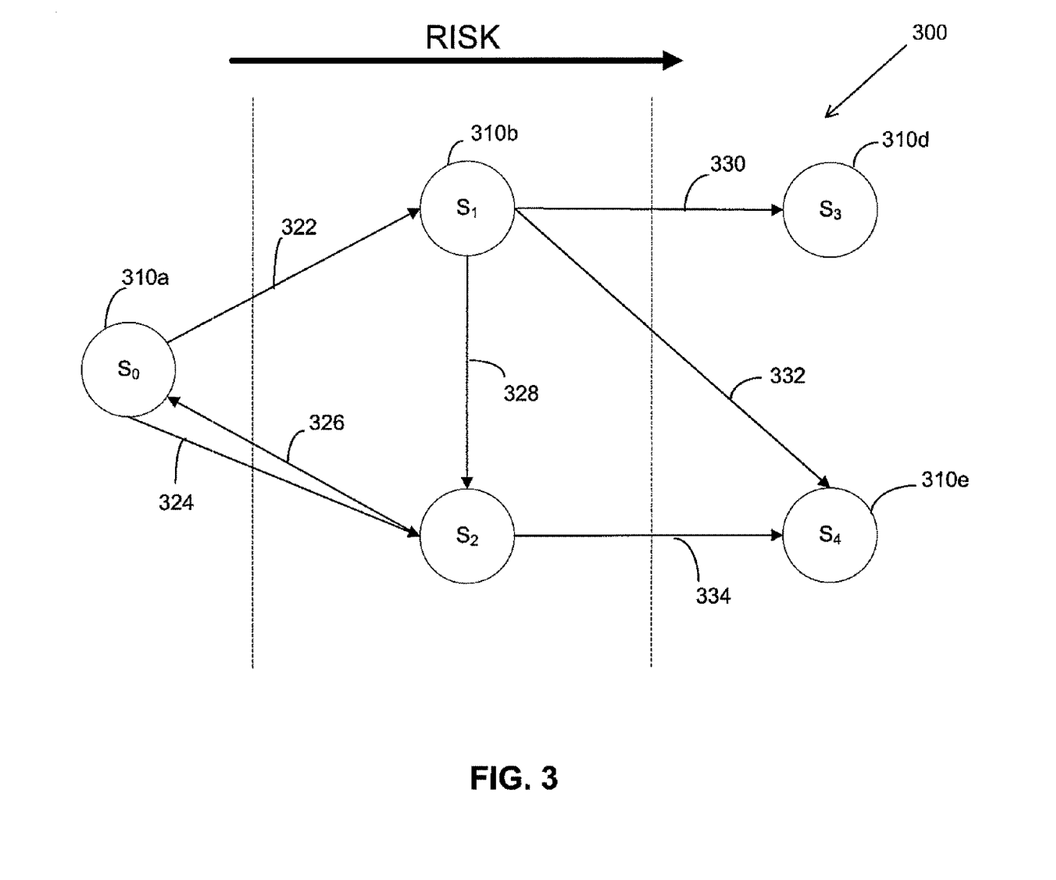
FIG. 3 is a generalized state diagram illustrating a plurality of states and transitions between the states in accordance with some embodiments of the invention.

FIG. 3 illustrates a schematic of an exemplary state diagram 300 for use with some embodiments of the invention. Each computer in an enterprise network may be associated with a malware state that reflects the chronological history of malware infections and remediation attempts and/or failures on the particular computer. Transitions between states may be determined by one or more anti-malware events generated by computers in the network. In state diagram 300, states 310a-310e correspond to circles $S_0$-$S_4$ and transitions between the states correspond to edges 322-332 which connect states 310a-310e. Mapping between states and risk is also schematically illustrated in state diagram 300 by vertical dashed lines, with states located on the right side of state diagram 300 being associated with a higher risk than states located on the left side of state diagram 300. It should be appreciated that the mapping between state and risk in state diagram 300 is merely for illustration only and any suitable mapping may alternatively be used.

As discussed above, transitions between states for a computer are based, at least in part, on the current state of the computer and one or more anti-malware events received from the computer. A set of rules defining the state transitions may be stored in or be accessible by aggregating server 114 which uses updating script 220 to determine if a received anti-malware event is sufficient to change the current state of a computer to a new state. If based on the rules, it is determined that the anti-malware event is sufficient to change the current state of a computer, the new state information for the computer may be stored in datastore 230 or may be transmitted to the computer to be stored locally.

Using exemplary state diagram 300, transitions between states is now briefly described. In one example, state $S_0$ may be an initial state of a computer after it joins a network and has been scanned for potential malware and cleaned if necessary. Because it can be assured that a computer in state $S_0$ does not contain malware, computers in state $S_0$ may be categorized as low risk. By classifying computers in state $S_0$ as low risk, an administrator of the network can be confident that although these computers will continued to be monitored by their respective anti-malware agents, that remediation efforts may be focused on other computers associated with higher risk levels.

In continuing the above example, repeated attempts to install malware on a computer in state $S_0$ may be detected by the anti-malware agent executing thereon and in response, an anti-malware event may be generated and transmitted to aggregating server 114 for analysis. Aggregating server 114 may determine that the received anti-malware event results in a transition of the computer's state along edge 322 from initial state $S_0$ to state $S_1$ that is mapped to a medium risk level. By associating the computer with a medium risk level, the administrator is informed that the computer may need to be serviced before a computer assigned a low risk level. For example, if a repeated infection for a particular computer is detected, the computer may need servicing or the user of the computer educated to prevent further infections. Servicing may include, but is not limited to, installing missing patches and increasing Firewall security. Accordingly, by assigning a risk level to computers in the network, the administrator can prioritize servicing of the computers based on the assigned risk level.

As shown in state diagram 300, more than one state may be defined within a particular risk level and how the states transition from a first state to a second state may depend on the particular detected anti-malware event. For example, instead of transitioning along edge 322 from state $S_0$ to state $S_1$ in response to a repeated attempt to install malware on a computer, a computer having a current state $S_0$ may transition along edge 324 to state $S_2$ if a different anti-malware event (e.g., actual detection of installed malware on the computer) is received by aggregating server 114. Although both state $S_1$ and $S_2$ may be mapped to a medium risk level, the action performed to clean computers in the two states may be different. For example, a computer in state $S_1$ may merely need to be monitored more closely, whereas a computer in state $S_2$ may need to be manually cleaned to remove installed malware. Furthermore, after malware has been cleaned from a computer in state $S_2$, the anti-malware agent on the computer may transmit another anti-malware event to aggregating server 114 which may, in turn, determine that the state of the computer returns to state $S_0$ by transitioning along edge 326. Alternatively, in some implementations, the computer transitions to a lower risk level after a certain amount of time has passed without detection of new malware. In one implementation, the risk level for a particular computer may be lowered one risk level following a short period of time (e.g., one day), and may be reset to the lowest risk level following a longer period of time (e.g., one week) without any malware detections.

The state associated with a computer may also transition within a risk level based on a detected anti-malware event. For example, if it is determined that a computer in state $S_1$ has become infected with malware, aggregating server 114 may determine that the state of the computer transitions from state $S_1$ to state $S_2$ along edge 328, but still be mapped to the medium risk level. Although the risk level classification for a particular computer may not change, the transition between states in the same risk level may provide useful information insofar as each state may be associated with a particular action to perform in an effort to transition a computer back into a state having a low risk level.

It should also be appreciated that computers may also be assigned higher risk levels if, for example, multiple infections have occurred within a predetermined amount of time or if repeated attempts to clean in the computer have been unsuccessful. For example, a computer may be associated with state $S_2$ because of a recent detection of malware on the computer. However, the anti-malware software executing on the computer may have repeatedly tried to remove the malware without success. In response to this situation, the anti-malware agent on the computer may transmit an anti-malware event to aggregating server 114 indicating that multiple attempts to clean the computer have failed. Aggregating server may determine that, based on this anti-malware event, the state of the computer transitions from state $S_2$ to state $S_4$ along edge 334. Accordingly, the computer may be classified as high risk thereby enabling an administrator to determine that servicing of the computer may be prioritized over computers associated with lower risks.

As discussed above with respect to states $S_1$ and $S_2$ mapped to a medium risk level, other risk levels, including a high risk level, may also be associated with multiple states and each of the states in the same risk level may provide useful information to an administrator regarding how to service a particular computer. For example, states $S_3$ and $S_4$ are defined in state diagram 300 as belonging to a high risk level. State $S_3$ may describe a computer that has been infected multiple times within a predetermined time period and a transition to state $S_3$ may occur along edge 330 from state $S_1$, whereas state $S_4$ may describe a computer that has had repeated unsuccessful cleaning attempts as described above. However, it should be appreciated that the above classifications for the states in state diagram 300 and as discussed above are merely exemplary and do not limit embodiments of the invention in any way.

Although state diagram 300 has been described as a particular implementation of an embodiment of the invention, it should be appreciated that various alterations to state diagram 300 are also possible. For example, although three risk levels are shown in state diagram 300, states may be mapped to more or fewer risk levels depending on the particular implementation. Furthermore, the number of defined states may be variable and the configuration of the edges that connect the states may be changed in any way that suits a particular implementation.

Figure 4:
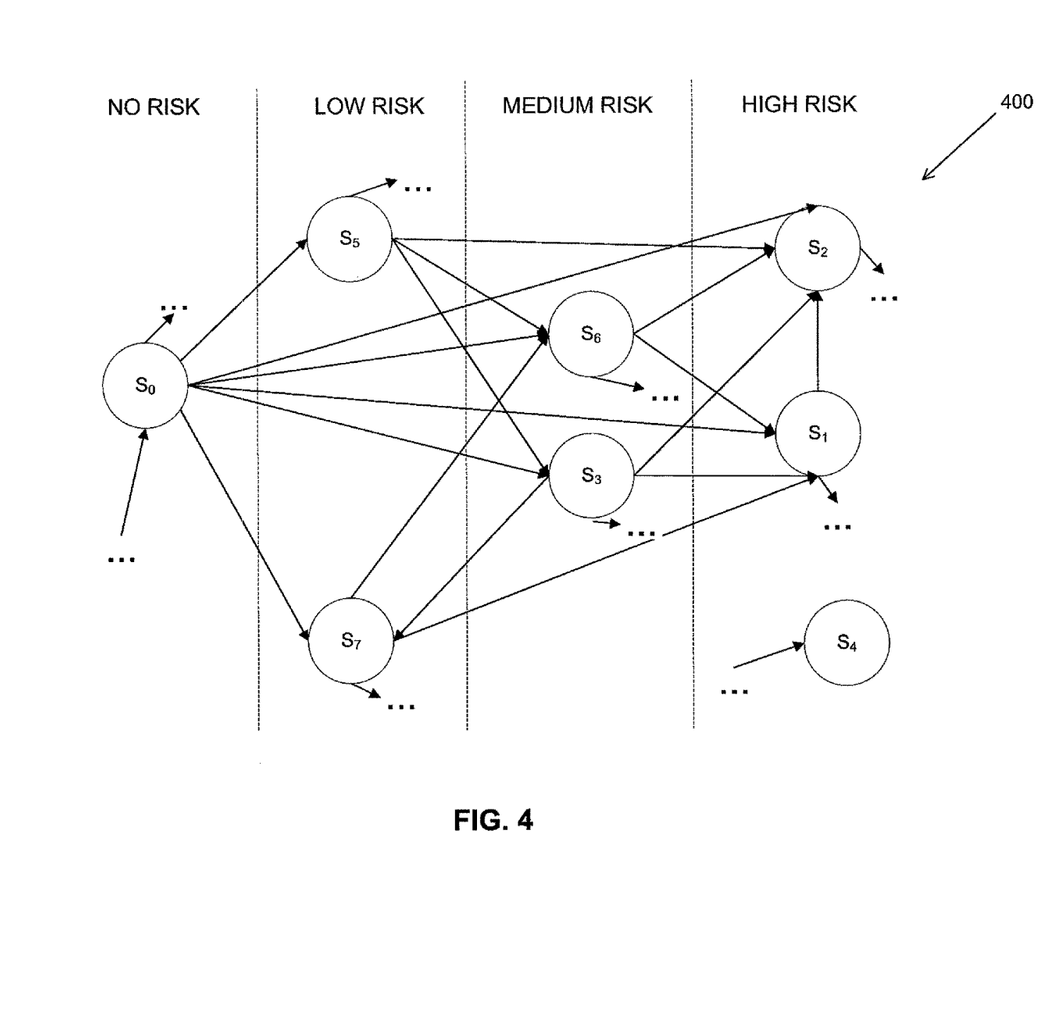
FIG. 4 is another example of a state diagram illustrating a plurality of states and transitions between the states in accordance with some embodiments of the invention.
Figure 5:
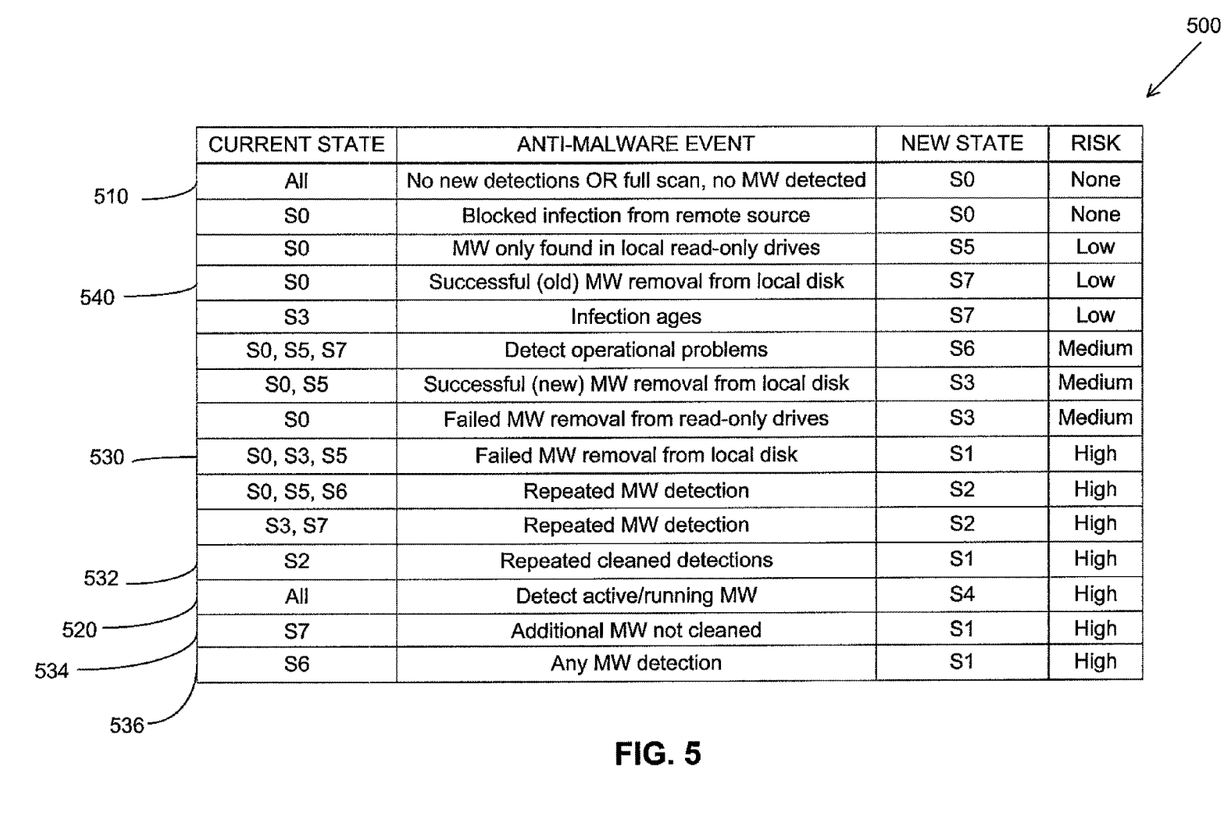
FIG. 5 is a table describing exemplary events that result in a client computer transitioning from a first state to a second state in accordance with some embodiments of the invention.

A specific implementation of a state diagram for use with some embodiments is now described with reference to FIGS. 4 and 5. FIG. 4 illustrates state diagram 400 and FIG. 5 illustrates corresponding state table 500 that describes transition relationships between a current state of a computer in a network and new state(s) of the computer based on particular types of anti-malware events. Also described in state table 500 is a mapping between a state of a computer and an associated risk level. However, although the mapping information between state and risk is provided as a portion of state table 500, other implementations in which the mapping information is provided separately from state table 500 is also contemplated by embodiments of the invention. State table 500 may be located in datastore 230 or alternatively, may be stored in another memory location that is accessible by aggregation server 114.

State diagram 400 is configured to map eight states $S_0$-$S_7$ to four risk levels. Transitions between the states are defined in state table 500 and are shown schematically as edges connecting the states in state diagram 400. In the example of state diagram 400, edges are shown connecting each of the states to state $S_0$ associated with the "No Risk" risk level or to state $S_4$ associated with the "High Risk" risk level as indicated by an edges pointing to ( . . . ). These transitions are represented, respectively, in entries 510 and 520 of state table 500 as transitioning from the current state "All" to the state $S_0$ when an anti-malware event indicates that no new malware has been detected (entry 510) or transitioning to state $S_4$ when an anti-malware event indicates that active/running malware (MW) has been detected on a computer in the network (entry 520). Each of the edges in state diagram 400 has a corresponding entry in the state table 500 that describes the transitions associated with each edge.

An explanation of the different states shown in state diagram 400 is described below. Computers in state $S_0$ are associated with no risk. Any computer may enter this state when no new detections are identified for some configurable period. Additionally, a deep inspection of the computer, such as a full scan or absence of the existence of malware for a long time may transition the computer into this state. Infection attempts that originate from an external source (e.g., a website) that fail to infect the computer do not necessarily transition the computer from this state. For example, infection on a remote share that is scanned by a computer in state $S_0$ will not cause the computer to transition from $S_0$. Other non-exhaustive examples include attempting to write malware from a remote computer to a local share, malware encountered on an internet site while browsing, or malware received as an email attachment.

One requirement for staying in state $S_0$ may be that the infection was successfully blocked. The nature of the block may be dependent on the type of infection and on an anti-malware operational method. For example, successful blocks may include an actual inline block of a write operation into a local disk, writing of an incoming file to local disk, immediately followed by a scan operation to determine the file risk, and then blocking or removing the file if it is found to be infected, or quarantine of the file. In some implementations, malware may be considered blocked if it was blocked from executing, disregarding whether it was possible or not to remove from the remote location itself. Thus, malware could stay on a server but pose no noticeable risk to a client computer which is constantly being protected by anti-malware software.

State $S_1$ in state diagram 400 indicates that an infection was not cleaned and exists on the host, although there is no evidence of the malware executing. A computer in state $S_1$ will be described in a specific example described below.

State $S_2$ indicates that repeated infections have been detected that threaten the computer. Although shown in the "High Risk" risk level portion of state diagram 400, state $S_2$ may alternatively be classified as "Medium Risk" or "Low Risk" depending on a threshold value for repeated infections.

State $S_3$ indicates that an infection was cleaned, but the signature of the infection is new. For example, in some instances the malware may have existed on the computer for a considerable amount of time but wasn't detected by older versions of anti-malware software.

State $S_4$ as discussed above may be entered from any other state in state diagram 400 and transition to this state occurs when active/running malware is detected on a computer.

State $S_5$ indicates that an infection was blocked from entering a computer but exists on a locally attached drive although no other evidence of the malware is found on the computer. For example, the malware may execute on reboot of the computer, the malware may have been written previously to the local drive by the computer, or the malware may be automatically executed when inserting the drive into a non-protected computer.

State $S_6$ indicates that the computer is reporting anti-malware operation problems such as the anti-malware software not functioning properly. A non-exclusive list of examples of anti-malware events that would trigger a transition to state $S_6$ include real-time protection is not running on the computer, some anti-malware events are missing from the reporting log, or the anti-malware events in the logs are not consistent (e.g., entries in a reporting log showing a detection event but no information about how remediation was attempted).

State $S_7$ indicates that the computer was cleaned but that the computer was broadly vulnerable to the malware at some point and the machine may still have some (albeit low) associate level of risk.

Although the eight states represented in state diagram 400 have been described, it should be appreciated that state diagram 400 is merely provided as an example of a state diagram in accordance with some embodiments of the invention and other state diagrams including more or less states of varying definitions and more or less transitions are also contemplated and included as part of this disclosure.

With reference to the exemplary enterprise network illustrated in FIG. 1, an example using state diagram 400 and state table 500 is now described. In one example, file server 112 may be a read-only file server which clients 110a-110n may access for retrieving files stored thereon. If file server 112 is infected with malware each of the clients may subsequently be infected when connecting file server 112 when requesting files to be retrieved. In a conventional malware reporting system, an administrator may examine the report logs and determine that each of the clients and the file server may be infected and need to be cleaned. However, the source of the infection may not be easily determined by the administrator because risk has not been assigned to the computers in the network. By contrast, in some embodiments of the invention, the file sever may be associated with one state that is mapped to a high risk level (e.g., state $S_1$), whereas each of the clients may be associated with another state that is mapped to a lower risk level (e.g., state $S_5$).

As indicated by entries 530, 532, 534, and 536 of state table 500, a computer may transition for multiple reasons to state $S_1$ that is mapped to a high risk level. In the example provided above in which a read-only file server is infected with malware, an anti-malware event of "failed malware removal from local disk" corresponding to entry 530 in state table 500 may be received from the file server because although malware has been detected, the file server is read-only and the malware may not be able to be removed by anti-malware software without intervention from an administrator. By contrast, each of the client computers may transition to state $S_5$ if an anti-malware event is received from these computers indicating that malware has been detected on the computer but it only appears on a read-only drive (e.g., CD-ROM drive) and does not present an immediate threat to the computer (entry 540 in state table 500). Because the infections on the client computers not pose an immediate threat, these computers are mapped to a lower risk. As should be appreciated from the foregoing, mapping risk levels to computers in a network may enable an administrator to prioritize the servicing of computers by focusing on computers with higher risk levels.

Figure 6:
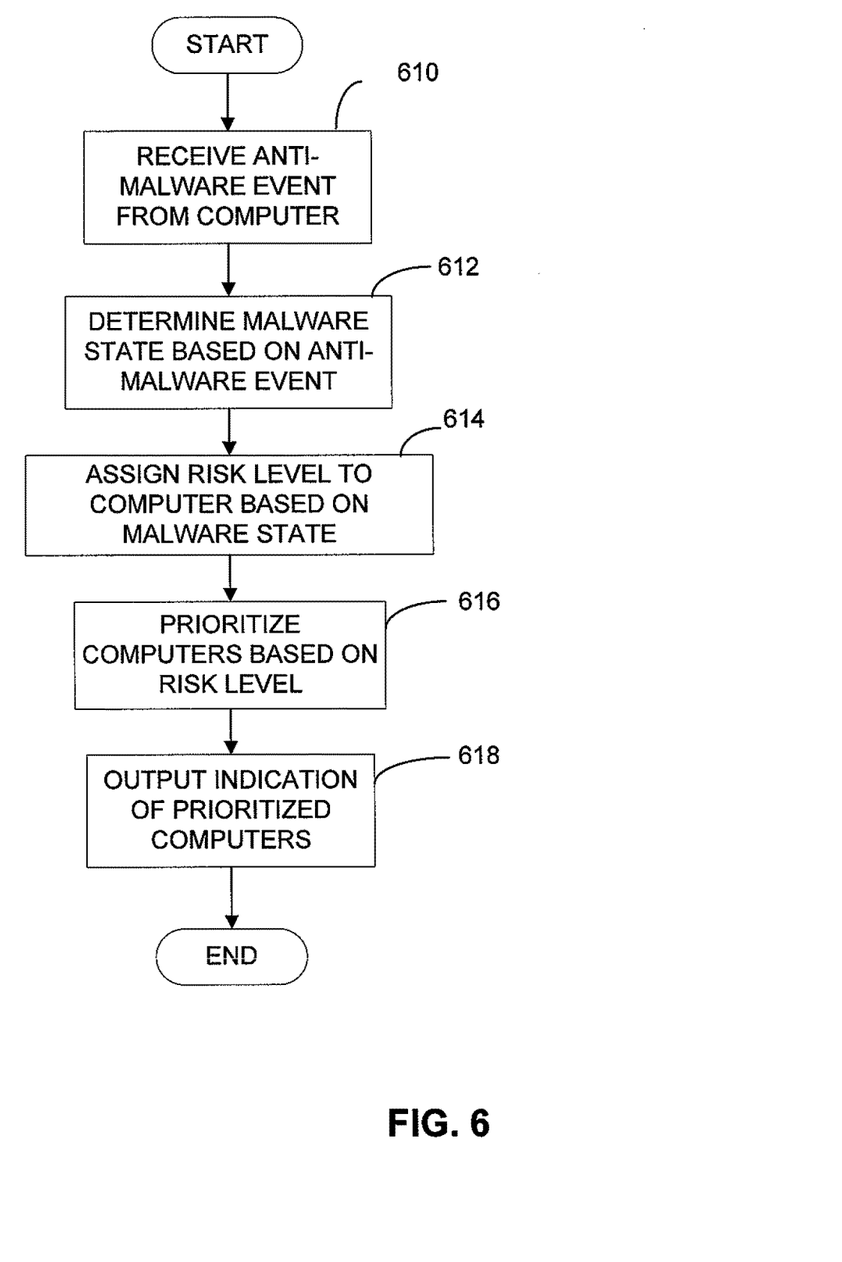
FIG. 6 is a flowchart illustrating a method of prioritizing clients based on anti-malware detection in accordance with some embodiments of the invention.

FIG. 6 illustrates a plurality of acts in a method of prioritizing computers in a network based on anti-malware detection in accordance with some embodiments of the invention. In act 610, an aggregating server receives an anti-malware event from a computer in the network. As described above, the anti-malware event may be received in response to a request from the aggregating server, the computer may transmit anti-malware events to the aggregating server at periodic intervals, and/or when a new anti-malware event is detected by the computer.

In act 612, the malware state of the computer that sent the anti-malware event is determined. For example, the aggregating server may issue a request for the current malware state of the computer to a datastore that stores the current malware states of the plurality of computers in the network. In response, the datastore may return the current malware state of the computer and the aggregating computer may determine if the malware state of the computer should be changed based on the received anti-malware event. This determination may be accomplished in any suitable way. For example, aggregating server may access a state table (e.g., state table 500 shown in FIG. 5) to determine if the malware state of the computer should be changed. Alternatively, aggregating server may determine if the malware state of the computer should be changed by using a plurality of stored rules or algorithms that encode the state transition information.

After the malware state of the computer has been determined in act 612 based, at least in part, on the received anti-malware event, a risk level is assigned to the computer in act 614. The aggregating server may assign a risk level to the computer using any suitable mapping technique. For example, in state table 500, the mapping between a malware state and a risk level is explicitly defined. In embodiments that employ a state table such as state table 500, the aggregating server may determine the mapping between state and risk level by retrieving the appropriate mapping information from one or more entries in the state table. In embodiments that use rules encoded in ways other than a state table, additional rules may be configured to provide mappings between states and risk levels. Alternatively, some combination of stored data and rules-based data may also be used and embodiments of the invention are not limited by the manner in which the mapping between state of a client computer and a risk level is implemented. For example, other data including, but not limited to, the importance of the resource and other reported data may also be used to determine the mapping between state of a computer and risk level.

In act 616, one or more of the computers in the network are prioritized based, at least in part, on their assigned risk level. For example, state diagram 300 shown in FIG. 3 defines three risk levels, whereas state diagram 400 shown in FIG. 4 defines four risk levels. Each of the risk levels may include one or more states that are associated with each of the computers in the network. By prioritizing the computers based, at least in part, on their assigned risk level, the output provided to an administrator regarding which infected computers to attend to first is enhanced. Prioritizing of the computers in the network may be performed in any suitable way. For example, computers assigned the same risk level may be grouped and output together or some or all of the computers in the network may be ranked and output to the administrator as a ranked list.

In act 618, an indication of the prioritized computers in the network is output to an administrator. The output may be provided to the administrator in any suitable format, some examples of which are described in more detail below. After the output indication is provided to an administrator, the process ends.

It should be appreciated that the method illustrated in FIG. 6 may be performed each time that an anti-malware event is received by the aggregating server, the method may be performed at predetermined intervals, and/or the method may be performed in response to a request from an administrator to perform a risk level assessment.

In another implementation, anti-malware events may be analyzed locally by individual computers that generate the events, and state and/or risk information for each computer may be provided to a centralized server for storage and/or presentation to the administrator. For example, a client computer may locally store one or more state tables and/or rules for determining the current malware state of the computer based on a previous malware state of the computer and one or more received events.

In another implementation a combination of local and network based analyses of anti-malware events is contemplated. For example, some computers in the network may have limited memory and/or processing resources and such computers may rely on network-based anti-malware event analysis, whereas other computers may implement local anti-malware event analysis and provide the results of the analysis to a central server for storage and/or prioritization of information for computers in the network.

Figure 7:
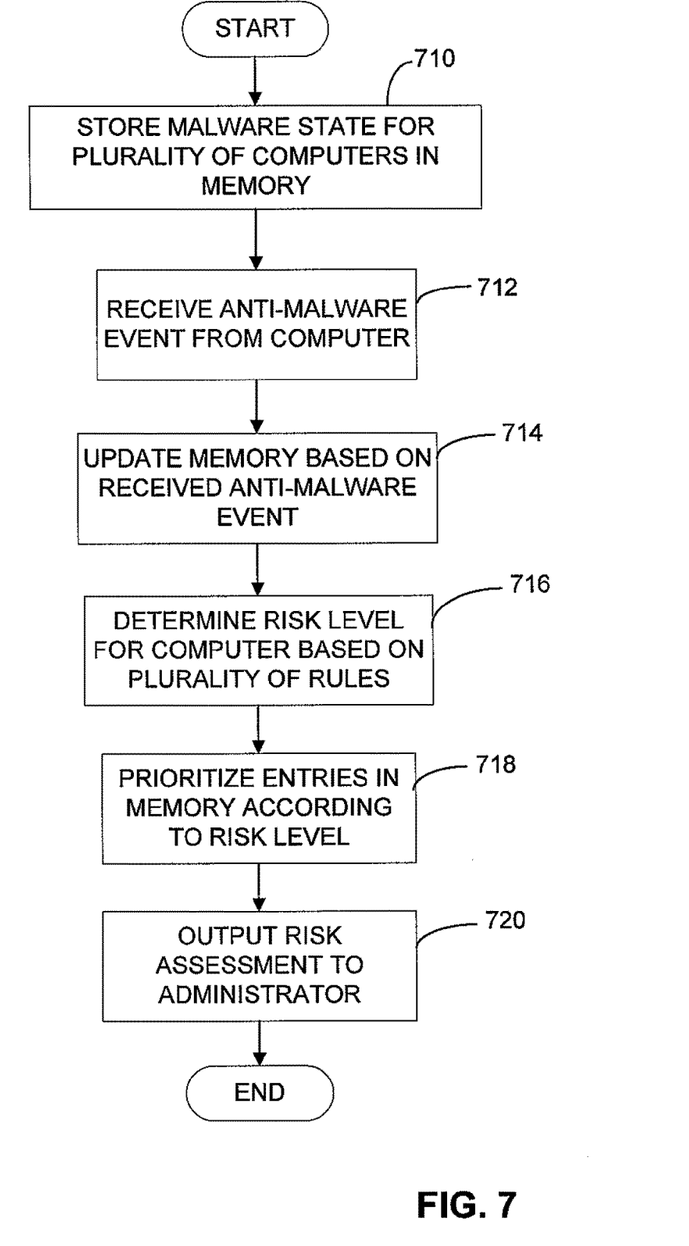
FIG. 7 is a flowchart illustrating a method of determining a risk assessment in accordance with some embodiments of the invention.

FIG. 7 describes another method for determining a risk assessment for a plurality of computers in a network in accordance with some embodiments of the invention. In act 710 the malware state for the plurality of computers is stored in memory. The memory may be any suitable memory that is accessible by an aggregating server that receives anti-malware events from computers in the network. For example, in the exemplary client-server architecture shown in FIG. 2, the memory may be datastore 230. The malware state for each of the plurality of clients may be stored using any format including, but not limited to, entries in a data structure. As described above, the malware state may alternatively be stored locally by individual computers and the malware state may be transmitted to the aggregating server when an anti-malware event is transmitted or in response to a request from the aggregating server to provide the current malware state of the computer.

In act 712, an anti-malware event is received by the aggregating server and the received anti-malware event is used to determine if the malware state of the computer that sent the anti-malware event should be changed. This determination may be performed in any suitable way including the methods described above and will not be repeated here, for brevity.

In act 714, the memory (or memories) that store the malware state for the plurality of computers in the network is updated based, at least in part, on the received anti-malware event and whether or not it was determined that the malware state of the computer should transition to a new malware state. If it was determined that the malware state of the computer should transition, the new malware state is associated with an entry for the computer in the memory. However, if it was determined that the malware state should not transition to a new malware state, the anti-malware event may be recorded in memory but the malware state associated with the computer may not change.

In act 716, the risk level for the computer may be determined based on a plurality of rules accessible to the aggregating server. As described above, a risk level may be assigned to a computer using any of a number of methods including using mappings between malware states and risk levels defined in a state table and/or using rules configured to provide such mappings. After the risk level for the computer has been determined, in some embodiments, the assigned risk level may be associated with the computer in memory by, for example, storing the risk level for the computer in an entry of a data structure that stores an identifier for the computer and the current malware state for the computer.

In act 718, the entries in the memory that store the malware state and/or risk level assigned to each of the computers in the network may be prioritized using one or more of the above-described prioritization methods or any other suitable method that enables the computers to be sorted based on their level of assigned risk.

In act 720, a risk assessment for the computers in the network is output to an administrator who may then use the prioritized information about the risk level assigned to the computers to determine which computers in the network to service first. The output may be formatted in any suitable form, some examples of which are provided in FIGS. 8 and 9 discussed in more detail below.

Figure 8:
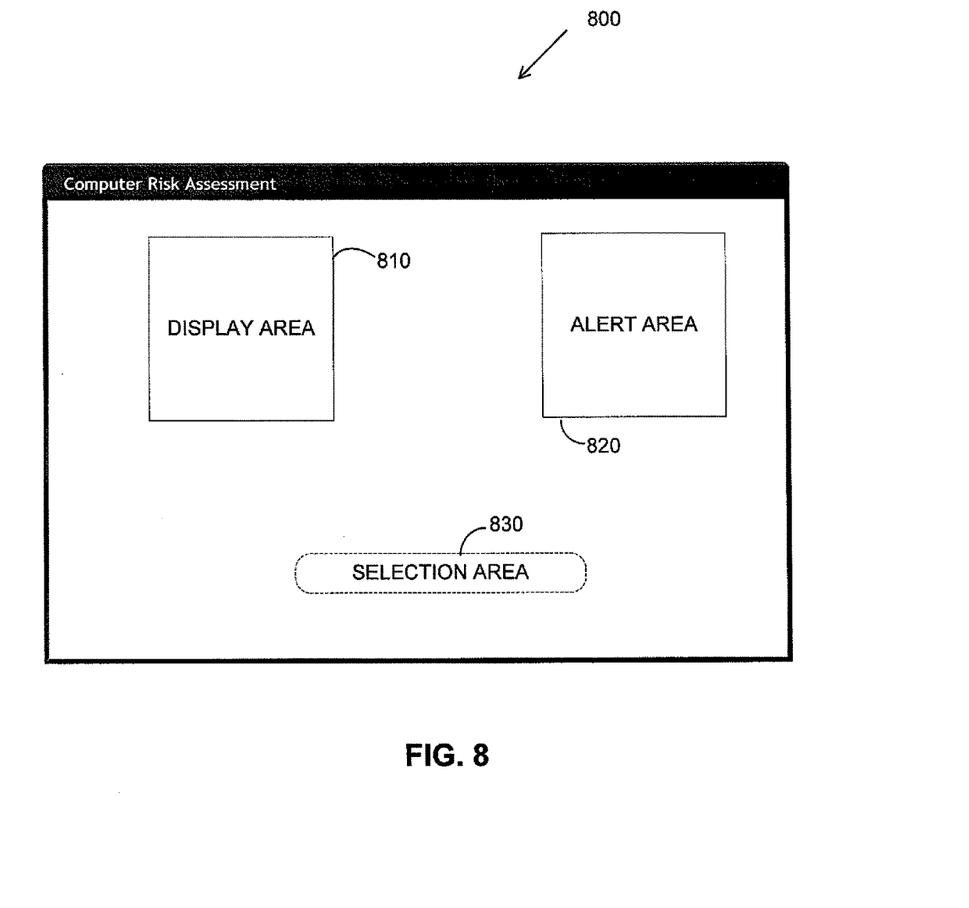
FIG. 8 is a schematic of a portion of a user interface that may be used to report the results of a risk assessment in accordance with some embodiments of the invention.

FIG. 8 illustrates a portion of an exemplary user interface 800 that may be used in accordance with some embodiments of the invention for providing risk level assessment information to an administrator of a network. User interface 800 includes one or more display areas 810, one or more alert areas 820, and optionally, one or more selection areas 830. Display area 810 may be configured to display the results of a risk level assessment performed by an aggregating server and transmitted to an administrator computer on which user interface 800 is displayed. For example, display area 810 may show which computers in the network were identified as high, medium, and low risk. In one implementation, the computers displayed in display area 810 may be color coded and/or the display font may be different according to their assigned risk level. Display area 810 may be implemented using any suitable format including, but not limited to, a text box, a drop down menu, or any other user interface display element.

User interface 800 also includes alert area 820 which may be configured to provide the administrator with alert information regarding computers that have a particular high risk and may be prioritized for servicing. Alert area 820 may include one or more audio or visual alert signals that focus the administrator's attention on particularly high-risk clients and alert area 820 may be configured in any way.

User interface 800 optionally includes selection area 830, which enables an administrator to transmit a request to an aggregating server to conduct a risk assessment of computers in the network. That is, rather than just being a passive display that displays results of a risk assessment conducted periodically by the aggregating server, in some embodiments, an administrator can initiate a risk assessment by interacting with selection area 830, e.g., by clicking in the area with a mouse or touching the selection area 830 on a touch-sensitive display. It should be appreciated that in some embodiments an interaction with selection area 830 may result in an initiation of a risk assessment process according to the methods depicted in FIGS. 6 and 7 and as described in more detail above.

Figure 9:
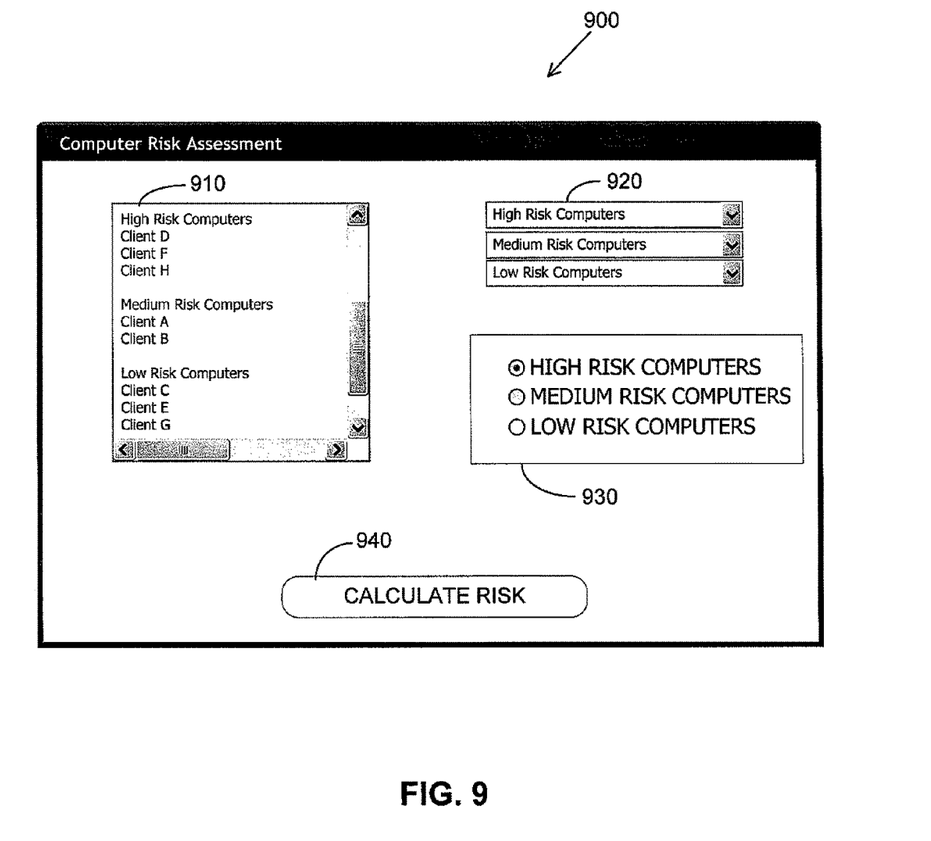
FIG. 9 is a schematic of a portion of a user interface that may be used to report the results of a risk assessment in accordance with some embodiments of the invention.

FIG. 9 illustrates a specific implementation of a user interface 900 that may be used with some embodiments of the invention. User interface 900 includes a plurality of display and selection areas that may be implemented in accordance with some embodiments. Scrollable text box 910 includes a listing of client computers that have been prioritized according to their assigned risk level. Upon viewing the results in scrollable text box 910, the administrator may determine that client computers D, F, and H may be serviced before the other computers because these computers have been assigned a higher risk level.

User interface 900 also includes a series of drop down menus 920 which enable an administrator to view only computers that have been assigned a particular risk level. Drop down menus 920 may be a particularly useful if, for example, the network includes a large number of computers and presenting the results in a list such as that shown in text box 910 is not ideal. Another way of filtering the results of a risk assessment for display by user interface 900 is to enable an administrator to select one of a series of radio buttons 930 that filter the list of computers based on a selected risk level and display only those computers that have been assigned the selected risk level.

User interface 900 also includes calculation button 940 with which an administrator may interact to initiate a risk level assessment of computers in the network. Insofar as the functionality of calculation button 940 has already been described in connection with selection area 830 of FIG. 8, a repetition of this functionality will not be presented for brevity.

Although user interface 900 includes four different areas configured to display and or select information related to a risk assessment, it should be readily appreciated that different implementations of a user interface for use with embodiments of the invention may have any number of display, alert, and/or selection areas depending on the particular implementation and/or preference of the administrator of the network and embodiments of the invention are not limited in this way.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, embodiments of the invention may be provided using a computer readable medium (or multiple computer readable media) (e.g., a computer memory, one or more floppy discs, compact discs, optical discs, magnetic tapes, flash memories, DVDs, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, embodiments of the invention may be provided via a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computer system, the method comprising:
    tracking, with at least one processor, a malware state for a plurality of computers connected via a network by:
        receiving an indication of an anti-malware event from at least one of the plurality of computers, the indication providing information about the anti-malware event; and
        determining the malware state of the at least one of the plurality of computers based, at least in part, on the received indication and a previously determined malware state from a previous anti-malware event, of the at least one of the plurality computers;
    assigning a risk level to at least some of the plurality of computers based on the determined malware state; and
    outputting an indication formatted to reflect a prioritization of the at least some of the plurality of computers based on their assigned risk level based on the determined malware state.

2. The method of claim 1, wherein determining the malware state comprises:
    analyzing chronological historical information regarding a malware infection and a malware remediation of the computer.

3. The method of claim 1, wherein determining the malware state comprises:
    analyzing a number of malware detections detected on the computer during an interval of time.

4. The method of claim 1, wherein determining the malware state comprises:
    analyzing a success or failure of at least one remediation following detection of at least one malware infection.

5. The method of claim 1, wherein determining the malware state comprises:
    analyzing a severity of a malware infection of the computer.

6. The method of claim 1, wherein the received indication indicates that the computer has been recently cleaned.

7. The method of claim 1, wherein the received indication indicates that an amount of time has elapsed since a last malware detection on the computer.

8. The method of claim 1, wherein outputting the indication comprises:
informing an administrator to prioritize servicing of the at least some of the plurality of computers associated with the highest risk level.

9. The method of claim 1 wherein assigning a risk level comprises:
transitioning from a first risk level to a second risk level based on the determined malware state.

10. A computer system comprising:
at least one storage device configured to store a malware state and a risk level for each of a plurality of computers connected via a network, wherein the malware state for each of the plurality of computers indicates a state of the computer, the state being one of a plurality of states; and
at least one processor programmed to:
receive an anti-malware event from a computer
determine a malware state for the computer based on the received anti-malware event and a previously determined malware state for the computer, the previous malware state stored on the at least one storage device prior to receiving the anti-malware event;
assign a risk level to the computer based, at least in part, on the determined malware state;
update the at least one storage device with the malware state and/or the risk level for the computer; and
output an indication formatted to reflect a prioritization of the at least some of the plurality of computers based on their assigned risk level.

11. The computer system of claim 10, wherein at least one of the plurality of states indicates a number of malware detections detected on the computer during an interval of time.

12. The computer system of claim 10, wherein at least one of the states indicates a success or failure of at least one remediation following detection of at least one malware infection.

13. The computer system of claim 10, wherein at least one of the plurality of states indicates a severity of at least one malware infection.

14. The computer system of claim 10, wherein the at least one processor is further programmed to:
informing an administrator to prioritize servicing of computers associated with the highest risk level.

15. The computer system of claim 10, wherein the at least one storage device comprises a datastore configured to store the malware states for the plurality of computers as records in the datastore.

16. A user interface programs stored on a computer readable storage device, comprising:
a selection area configured to detect a user interaction and instruct at least one processor to execute a plurality of computer-readable instructions to initiate a risk assessment process for each of a plurality of client computers connected via a network to determine a risk level associated with each of the plurality of client computers in response to detecting the user interaction; and
a display area configured to display the risk levels associated with at least some of the plurality of client computers.

17. The user interface of claim 16, wherein the display area comprises at least one text box.

18. The user interface of claim 16, wherein the display area comprises at least one drop down menu.

19. The user interface of claim 16, wherein the display area is configured to be updated periodically without a user interaction with the selection area.

20. The user interface of claim 16, further comprising:
an alert area configured to automatically display a risk level for a computer without a user interaction with the selection area.

* * * * *